(12) United States Patent
Inagaki

(10) Patent No.: US 8,203,774 B2
(45) Date of Patent: Jun. 19, 2012

(54) OPTICAL SCANNING DEVICE

(75) Inventor: Yoshihiro Inagaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/172,529

(22) Filed: Jun. 29, 2011

(65) Prior Publication Data

US 2012/0002262 A1   Jan. 5, 2012

(30) Foreign Application Priority Data

Jun. 30, 2010   (JP) .................................. 2010-148850

(51) Int. Cl.
  *G02B 26/08*   (2006.01)
(52) U.S. Cl. .................................. 359/216.1; 359/217.1
(58) Field of Classification Search .... 359/216.1–219.2; 347/261

See application file for complete search history.

(56) References Cited

U.S. PATENT DOCUMENTS

| | | | |
|---|---|---|---|
| 5,615,038 | A | 3/1997 | Suzuki et al. |
| 5,815,301 | A | 9/1998 | Naiki et al. |
| 7,477,437 | B1 | 1/2009 | Inagaki et al. |
| 2002/0008896 | A1 | 1/2002 | Ishibe |
| 2007/0091402 | A1 | 4/2007 | Tomioka |
| 2008/0225105 | A1* | 9/2008 | Kudo ............................. 347/235 |

FOREIGN PATENT DOCUMENTS

| | | |
|---|---|---|
| EP | 1 637 916 | 3/2006 |
| EP | 2 012 146 | 1/2009 |
| JP | 2000-19444 | 1/2000 |
| JP | 2001-208995 | 8/2001 |
| JP | 2009-42605 | 2/2009 |

OTHER PUBLICATIONS

European Search Report mailed Oct. 12, 2011, directed to counterpart European Application No. 11 17 0957; 7 pages.

\* cited by examiner

*Primary Examiner* — James Phan
(74) *Attorney, Agent, or Firm* — Morrison & Foerster LLP

(57) ABSTRACT

An optical scanning device having: a light source for emitting a light beam; a deflector having a plurality of flat reflecting surfaces; a first optical system disposed between the light source and the deflector; and a second optical system disposed between the deflector and a photoreceptor surface, and configured such that the reflecting surfaces of the deflector and the photoreceptor surface are conjugated in a sub-scanning direction at every deflection angle in a main-scanning range. In the optical scanning device, the light beam traveling from the first optical system to the deflector has a width greater than a dimension in a main-scanning direction of each reflecting surface of the deflector, and the light beam passes through different portions of the first optical system depending on whether the light beam is to be deflected by the deflector to be directed to an edge portion of the main-scanning range or to be directed to a center portion of the main-scanning range such that the light beam traveling to the deflector has a smaller average wavefront curvature in a sub-scanning direction when the light beam is to be deflected by the deflector to be directed to an edge portion of the main-scanning range than when the light beam is to be deflected by the deflector to be directed to the center portion of the main-scanning range.

4 Claims, 16 Drawing Sheets

F I G. 1
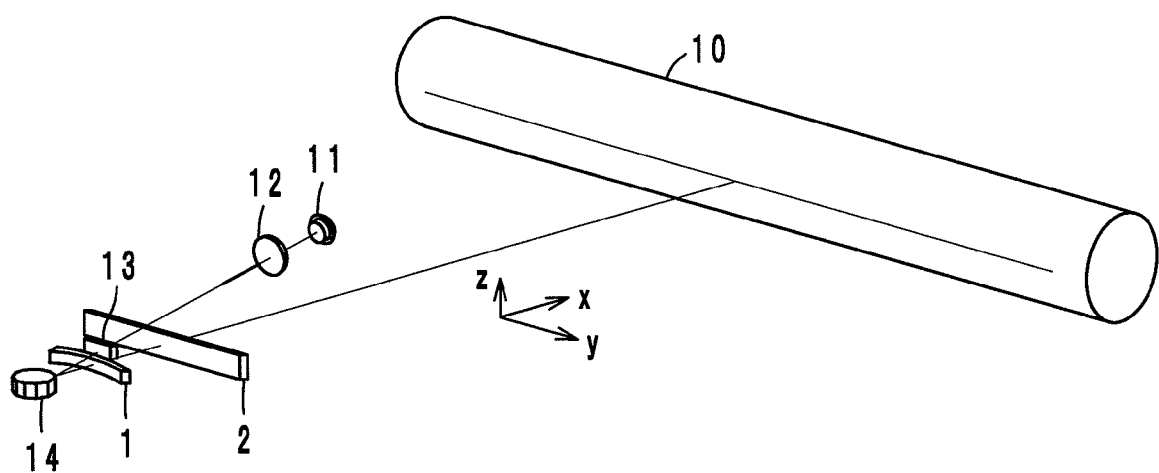

F I G. 3A
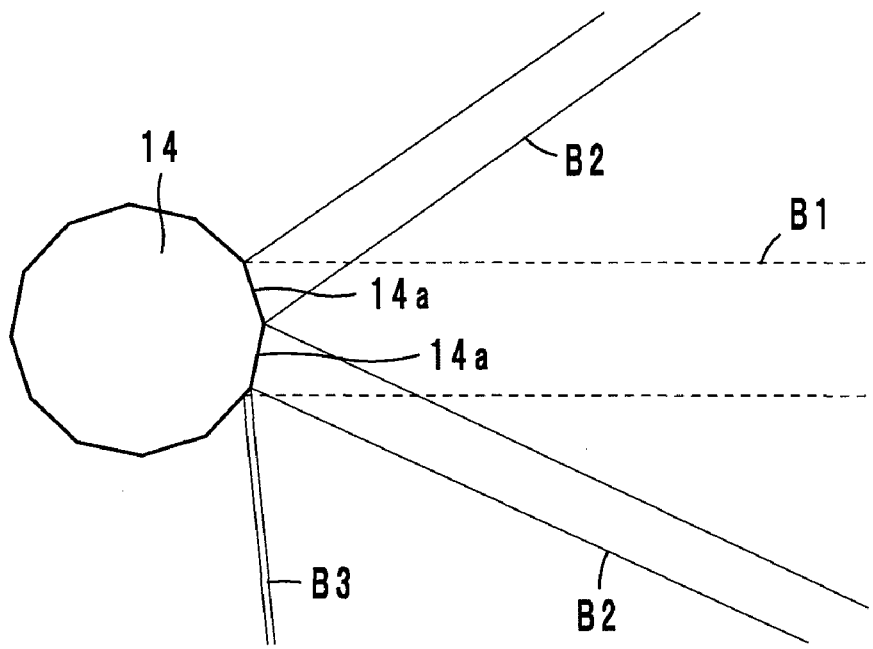
F I G. 3B
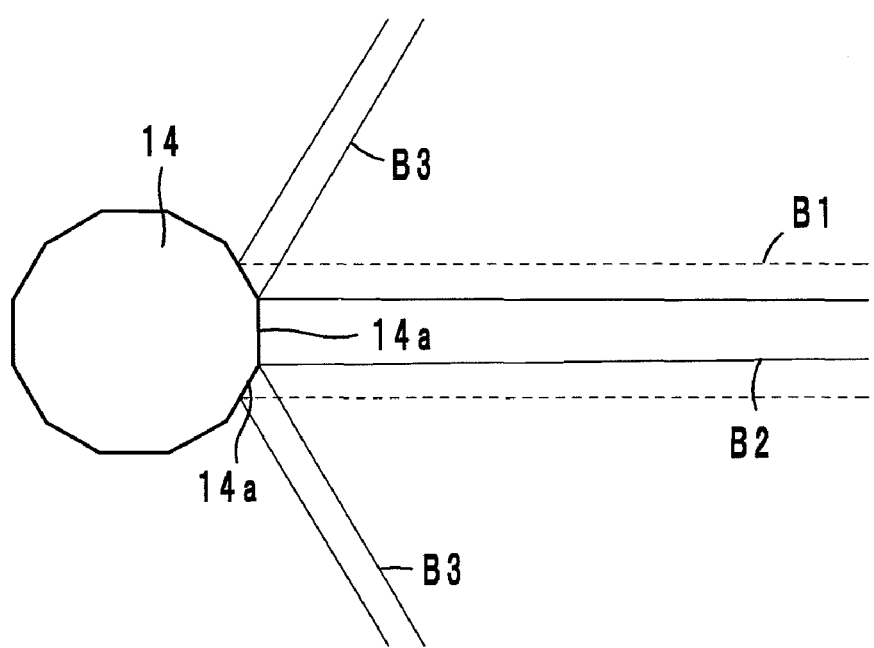

F I G. 4
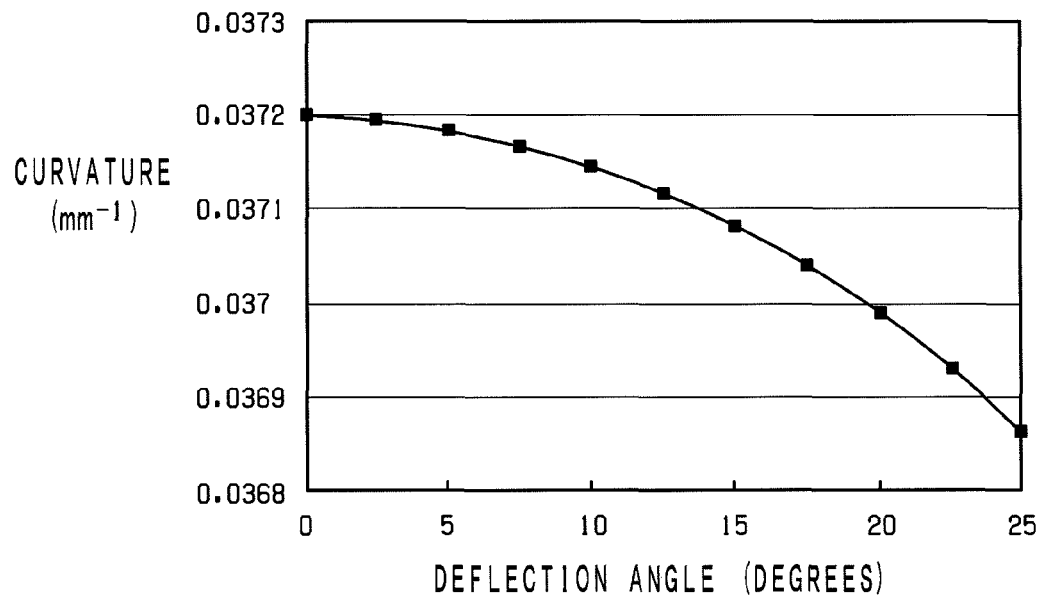
F I G. 5
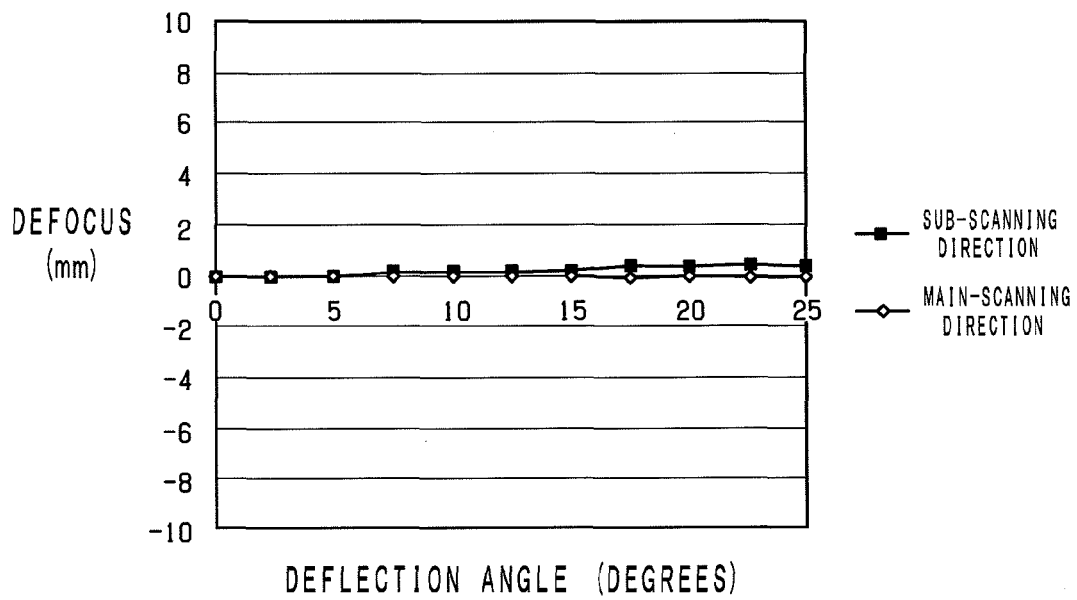

EMBODIMENT 2
AVERAGE WAVEFRONT CURVATURE
(SUB-SCANNING DIRECTION)

EMBODIMENT 2
FIELD CURVATURE

OPTICAL SCANNING DEVICE

This application is based on Japanese Patent Application No. 2010-148850 filed on Jun. 30, 2010, the content of which is incorporated herein by reference.

BACKGROUND OF THE INVENTION

1. Field of the Invention

The present invention relates to an optical scanning device, in particular, to an optical scanning device for irradiating a photoreceptor with light to form an electrostatic latent image.

2. Description of Related Art

There has conventionally been proposed a technique for downsizing an optical scanning device by using an over-filled optical system with a high scanning efficiency to cancel aberrations of a scanning optical system with aberrations of a light source optical system, as described in Japanese Patent Laid-Open Publication No. 2001-208995, for example.

However, when an over-filled optical system is used, a converging point in the vicinity of a polygon mirror of a light beam that has passed through a light source optical system may be displaced from reflecting surfaces of the polygon mirror depending on the angle of view, due to movement of the reflecting surfaces along with rotations of a polygon mirror. Therefore, there has been a problem that the light beam is focused onto a point displaced from the photoreceptor surface if the reflecting surfaces and the photoreceptor surface are maintained in conjugation, and conversely, if the preference is given to focusing the light beam onto the photoreceptor surface, the conjugate relation is lost, and errors in the angle of reflecting surfaces of the polygon mirror cannot be corrected adequately. In particular, in attempting to downsize the device, a sub-scanning magnification is increased, and it is impossible to correct both errors in the angle of reflecting surfaces and errors in the sub-scanning-direction image surface at the same time.

SUMMARY OF THE INVENTION

In view of the above problems, an object of the present invention is to provide an optical scanning device that is capable of achieving a good balance between focusing of a light beam onto a photoreceptor surface and correction to errors in the angle of reflecting surfaces of a polygon mirror by using an over-filled optical system.

An optical scanning device according to an embodiment of the present invention comprises: a light source for emitting a light beam; a deflector having a plurality of flat reflecting surfaces; a first optical system disposed between the light source and the deflector; and a second optical system disposed between the deflector and a photoreceptor surface, and configured such that the reflecting surfaces of the deflector and the photoreceptor surface are conjugated in a sub-scanning direction at every deflection angle in a main-scanning range; wherein the light beam traveling from the first optical system to the deflector has a width greater than a dimension in a main-scanning direction of each reflecting surface of the deflector, and wherein the light beam passes through different portions of the first optical system depending on whether the light beam is to be deflected by the deflector to be directed to an edge portion of the main-scanning range or to be directed to a center portion of the main-scanning range such that the light beam traveling to the deflector has a smaller average wavefront curvature in a sub-scanning direction when the light beam is to be deflected by the deflector to be directed to an edge portion of the main-scanning range than when the light beam is to be deflected by the deflector to be directed to the center portion of the main-scanning range.

BRIEF DESCRIPTION OF THE DRAWINGS

This and other objects and features of the present invention will be apparent from the following description with reference to the accompanying drawings, in which:

FIG. 1 is a perspective view illustrating a schematic configuration of an optical scanning device to which the present invention is applied;

FIG. 2A is an illustration of the optical path crossed in a main-scanning direction showing a state wherein a light beam is deflected at a deflection angle to be directed to an edge portion of a photoreceptor, FIG. 2B is an illustration of the part of the optical path before a polygon mirror crossed in the main-scanning direction showing the state wherein the light beam is deflected at the deflection angle to be directed to the edge portion of the photoreceptor, FIG. 2C is an illustration of the part of the optical path after the polygon mirror crossed in the main-scanning direction showing a state wherein the light beam is deflected at a deflection angle to be directed to a center portion of the photoreceptor, and FIG. 2D is an illustration of the optical path crossed in a sub-scanning direction;

FIG. 3A and FIG. 3B respectively show light beams reflected by reflecting surfaces of the polygon mirror in the first embodiment, where FIG. 3A is an illustration of light beams reflected on the reflecting surfaces of the polygon mirror at deflection angles to be directed the edge portions of the photoreceptor, and FIG. 3B is an illustration of a light beam that is reflected on a reflecting surface of the polygon mirror at a deflection angle to be directed to the center portion of the photoreceptor;

FIG. 4 is a graph showing an average wavefront curvature in a sub-scanning direction of a light beam in the first embodiment;

FIG. 5 is a graph showing a field curvature in the first embodiment;

FIG. 10A is an illustration of the optical path crossed in a main-scanning direction showing a state wherein a light beam is deflected at a deflection angle to be directed to an edge portion of a main-scanning range, FIG. 10B is an illustration of the part of the optical path before a polygon mirror crossed in the main-scanning direction showing the state wherein the light beam is deflected at a deflection angle to be directed to the edge portion of the main-scanning range, FIG. 10C is an illustration of the part of the optical path after the polygon mirror crossed in the main-scanning direction showing a state wherein the light beam is deflected at a deflection angle to be directed to a center portion of the main-scanning range, and FIG. 10D is an illustration of the optical path crossed in a sub-scanning direction;

FIG. 15A is an illustration of the optical path crossed in a main-scanning direction showing a state wherein a light beam is deflected at a deflection angle to be directed to an edge portion of a main-scanning range, FIG. 15B is an illustration of the part of the optical path before a polygon mirror crossed in the main-scanning direction showing the state wherein the light beam is deflected at a deflection angle to be directed to the edge portion of the main-scanning range, FIG. 15C is an illustration of the part of the optical path after the polygon mirror crossed in the main-scanning direction showing a state wherein the light beam is deflected at a deflection angle to be directed to a center portion of the main-scanning range, and FIG. 15D is an illustration of the optical path crossed in a sub-scanning direction;

FIG. 20A is an illustration of the optical path crossed in a main-scanning direction showing a state wherein a light beam is deflected at a deflection angle to be directed to an edge portion of a main-scanning range, FIG. 20B is an illustration of the part of the optical path before a polygon mirror crossed in the main-scanning direction showing the state wherein the light beam is deflected at a deflection angle to be directed to the edge portion of the main-scanning range, FIG. 20C is an illustration of the part of the optical path after the polygon mirror crossed in the main-scanning direction showing a state wherein the light beam is deflected at a deflection angle to be directed to a center portion of the main-scanning range, and FIG. 20D is an illustration of the optical path crossed in a sub-scanning direction;

DETAILED DESCRIPTION OF THE PREFERRED EMBODIMENTS

Figure 2A:
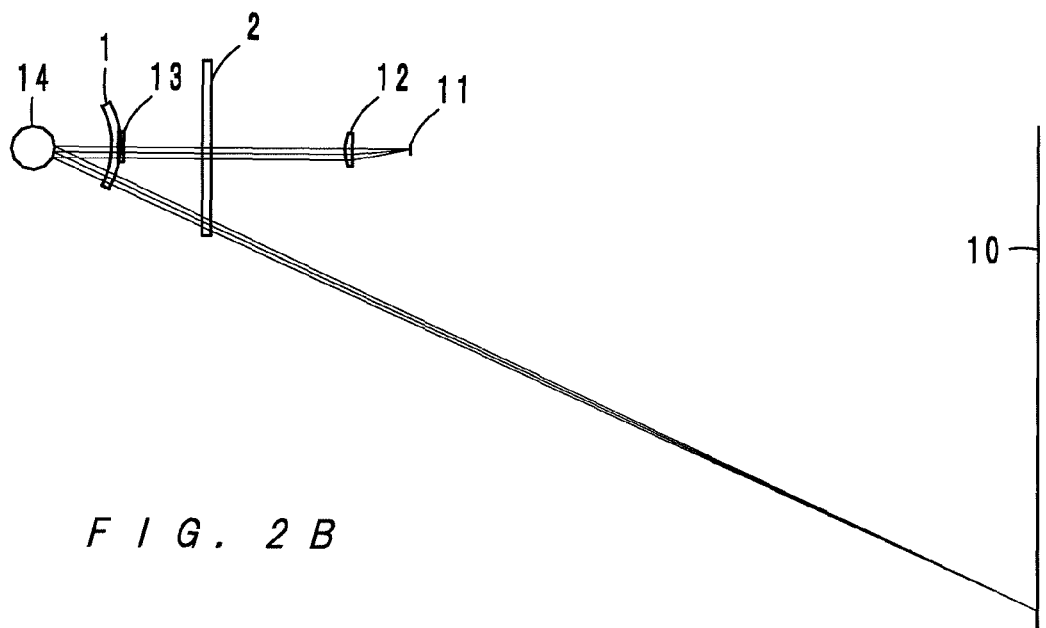
FIG. 2A to FIG. 2D show an optical path according to a first embodiment, where
Figure 2B:
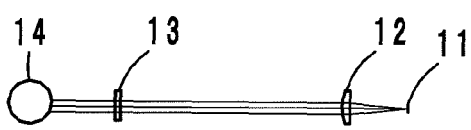
Figure 2C:
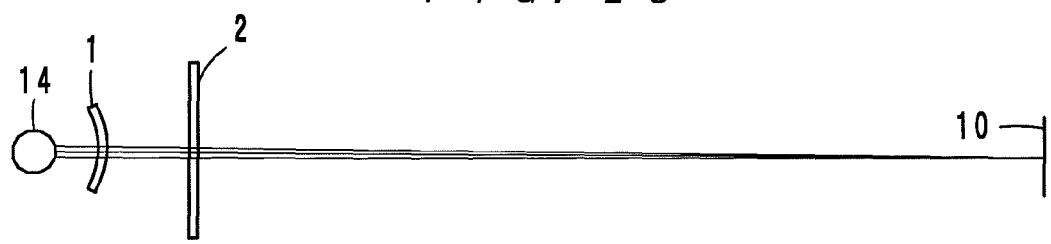
Figure 2D:
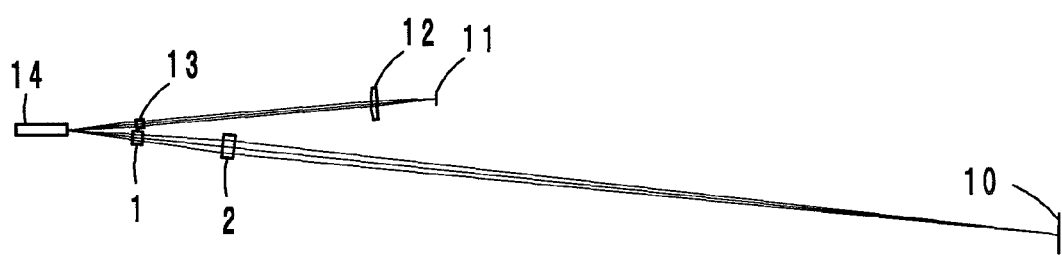

Optical scanning devices according to some embodiments of the present invention will be hereinafter described. Throughout the drawings, the same components and parts are denoted by the same reference symbols, and will not be described redundantly.

Basic Configuration of Optical Scanning Device; See FIG. 1

First, a schematic configuration of an optical scanning device according to the present invention will be described with reference to FIG. 1. The optical scanning device generally comprises a laser diode 11 as a light source, a collimator lens 12, a free-form-surface lens 13, a polygon mirror 14 having a plurality of flat reflecting surfaces, and scanning lenses 1 and 2. A laser beam emitted from the laser diode 11 is first collimated by the collimator lens 12 and passes through the free-form-surface lens 13 to be shaped into a convergent light beam in a sub-scanning direction z. Then, the light beam is deflected in a main-scanning direction y by the reflecting surfaces of the polygon mirror 14 and focused on a photoreceptor 10 by way of the scanning lenses 1 and 2. Such a basic operation of writing an image on the photoreceptor 10 by main scanning of a light beam and rotation of the photoreceptor 10 (sub scanning) is well known.

First Embodiment

See FIGS. 2 to 9

An optical scanning device according to a first embodiment, as shown in FIG. 2A to FIG. 2D, comprises a laser diode 11, a collimator lens 12, a free-form-surface lens 13, a polygon mirror 14 and scanning lenses 1 and 2. A light beam B1 incident to the reflecting surfaces of the polygon mirror 14 is wider in the main-scanning direction y than a single reflecting surface 14a of the polygon mirror 14 (see FIG. 3A and FIG. 3B), and the width of a light beam used for image writing is regulated by the reflecting surface 14a. In FIG. 2A to FIG. 2D, it is drawn that the light beam B1 in an upstream side has the same width as that after the regulation. As is apparent from comparison of FIG. 2A and FIG. 2B, the portion of the free-form-surface lens 13 through which a light beam B2 used for image writing passes changes as a deflection angle changes.

FIG. 3A and FIG. 3B show the light beam B2 reflected on the polygon mirror 14, and a light beam B3 that is not used for image writing. The light beam B1 incident to the polygon mirror 14 is illustrated by a dotted line. FIG. 3A shows the light beam B2 deflected at an angle to be directed to an edge portion of a main-scanning range, and FIG. 3B shows the laser beam B2 deflected at an angle to be directed to a center portion of the main-scanning range. The light beams B3 are not used for image writing and are shielded by shielding members so as not to reach the reach the photoreceptor 10.

Table 1, Table 2 and Table 3 below show construction data that numerically represents the first embodiment.

TABLE 1

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface | 29.89 | 0.00 | 2.61 | −0.9962 | 0.0000 | −0.0872 | 0.0000 | 1.0000 | 0.0000 |
| 4 | Lens | 26.90 | 0.00 | 2.35 | −0.9962 | 0.0000 | −0.0872 | 0.0000 | 1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Scanning Lens 1 | 25.00 | 0.00 | −2.19 | 0.9962 | 0.0000 | −0.0872 | 0.0000 | 1.0000 | 0.0000 |
| 7 | | 29.48 | 0.00 | −2.58 | 0.9962 | 0.0000 | −0.0872 | 0.0000 | 1.0000 | 0.0000 |
| 8 | Scanning Lens 2 | 60.00 | 0.00 | −5.25 | 0.9962 | 0.0000 | −0.0872 | 0.0000 | 1.0000 | 0.0000 |
| 9 | | 63.98 | 0.00 | −5.60 | 0.9962 | 0.0000 | −0.0872 | 0.0000 | 1.0000 | 0.0000 |
| 10 | Photoreceptor Surface | 384.01 | 0.00 | −39.09 | 1.0000 | 0.0000 | 0.0000 | 0.0000 | 1.0000 | 0.0000 |

TABLE 2

Surface No. 1: Spherical Surface
Curvature 4.33126E−03

Surface No. 2: Axisymmetric Aspherical Surface
Curvature

−6.68860E−02

| Degree | Coefficient |
|---|---|
| 4 | 2.50752E−05 |
| 6 | 8.92745E−08 |
| 8 | −2.78758E−10 |
| 10 | 2.15187E−11 |
| 12 | −2.55070E−13 |

Surface No. 3: Free-form Surface

| | j | |
|---|---|---|
| i | 2 | 4 |
| 0 | 3.02297E−02 | −1.90151E−04 |
| 2 | −7.67980E−05 | 2.69718E−05 |
| 4 | 1.90197E−06 | −7.89829E−07 |

TABLE 3

Surface No. 6: Free-form Surface

| | j |
|---|---|
| i | 0 |
| 2 | −2.30508E−02 |
| 4 | 1.06777E−05 |
| 6 | 8.49138E−08 |
| 8 | −1.05293E−10 |
| 10 | −8.92901E−14 |

| | j | | |
|---|---|---|---|
| i | 0 | 1 | 2 |

Surface No. 7: Free-form Surface

| | | | |
|---|---|---|---|
| 0 | 0.00000E+00 | −1.31115E−02 | 9.95774E−03 |
| 2 | −2.50318E−02 | 5.47629E−05 | −1.44320E−05 |
| 4 | 6.98392E−06 | 7.59146E−08 | −1.78073E−07 |
| 6 | 5.07320E−08 | −4.23976E−10 | 3.09316E−10 |
| 8 | 3.44561E−11 | 0.00000E+00 | 0.00000E+00 |
| 10 | −1.91880E−13 | 0.00000E+00 | 0.00000E+00 |

TABLE 3-continued

Surface No. 8: Free-form Surface

| | | | |
|---|---|---|---|
| 0 | 0.00000E+00 | 2.41236E−02 | 1.95587E−02 |
| 2 | −1.41659E−03 | 4.05220E−05 | −5.08453E−06 |
| 4 | 2.77607E−06 | −2.20958E−08 | −2.57753E−09 |
| 6 | −1.69201E−09 | 7.95743E−12 | 6.51898E−12 |
| 8 | 6.98043E−13 | −1.83313E−16 | −5.83868E−15 |
| 10 | −1.45219E−16 | −9.05870E−19 | 2.09537E−18 |

The collimator lens 12 is an axisymmetric aspherical lens made of glass. The free-form-surface lens 13 is a non-axisymmetric lens made of resin and has a free-form surface on the side closer to the light source. The scanning lenses 1 and 2 are made of resin, and each has a free-form surface. The light beam has a wavelength of 780 nm. When this wavelength is used, the glass of the lens 13 has a refraction index of 1.564, and the resin of the lenses 13, 1 and 2 has a refraction index of 1.572. The coordinates shown as the position of the polygon mirror 14 in Table 1 are the coordinates of a reflecting surface that reflects the light beam B2 at a deflection angle of 0°. In the first embodiment, the polygon mirror is in the shape of a dodecagon whose inscribed circle has a diameter of 20 mm.

Here, the free-form surface is expressed by Equation 1 below.

$$x = \sum_{i=0}^{8} \sum_{j=0}^{4} a_{ij} y^i z^j \quad (1)$$

The axisymmetric aspherical surface is expressed by Equation 2 below.

$$x = \frac{c(y^2 + z^2)}{1 + \sqrt{1 - c^2(y^2 + z^2)}} + \sum_{i=0}^{12} a_i \left(\sqrt{y^2 + z^2}\right)^i \quad (2)$$

Coefficients that are not shown in the tables above are all taken as 0.

In the first embodiment, for the free-form surface, only even orders are used for y, and the free-form surface is of a shape that is symmetric in y direction. For the free-form surface on the side of the lens 13 closer to the light source, only a second order is used for z, and the free-form surface has a straight line where z=0. Further, the form in an xz cross-section is parabolic, and the slope of the parabola changes according to the value of y.

The light beam incident to the free-form-surface lens 13 is a parallel bundle of rays, but the light beam emergent from the lens 13 is collimated in the main-scanning direction y and convergent in the sub-scanning direction z. Further, the converging position in the sub-scanning direction z varies depending on the position in the main-scanning direction within the light beam. FIG. 4 shows the result of a simulation to calculate an average wavefront curvature in the sub-scanning direction z of the light beam immediately after emergent from the free-form-surface lens 13. The wavefront curvature decreases as the deflection angle increases.

FIG. 5 shows calculated defocus from the photoreceptor 10 and represents a field curvature.

Figure 6:
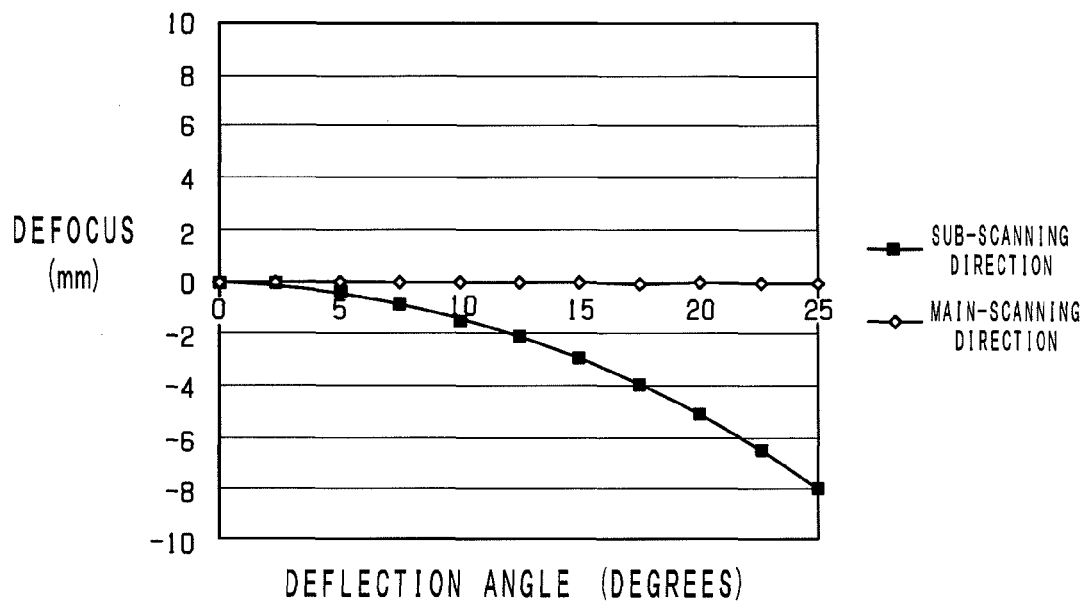
FIG. 6 is a graph showing a field curvature in a comparative example 1.

FIG. 6 shows calculated defocus in a comparative example 1. In the comparative example 1, the free-form-surface lens 13 in the first embodiment is replaced with a cylindrical lens. According to the comparative example 1, an over-filled optical system is used, and the converging point in the sub-scanning direction z in the vicinity of the polygon mirror 14 is constant and does not vary even if the position of the light source optical system through which the light beam passes.

Figure 7:
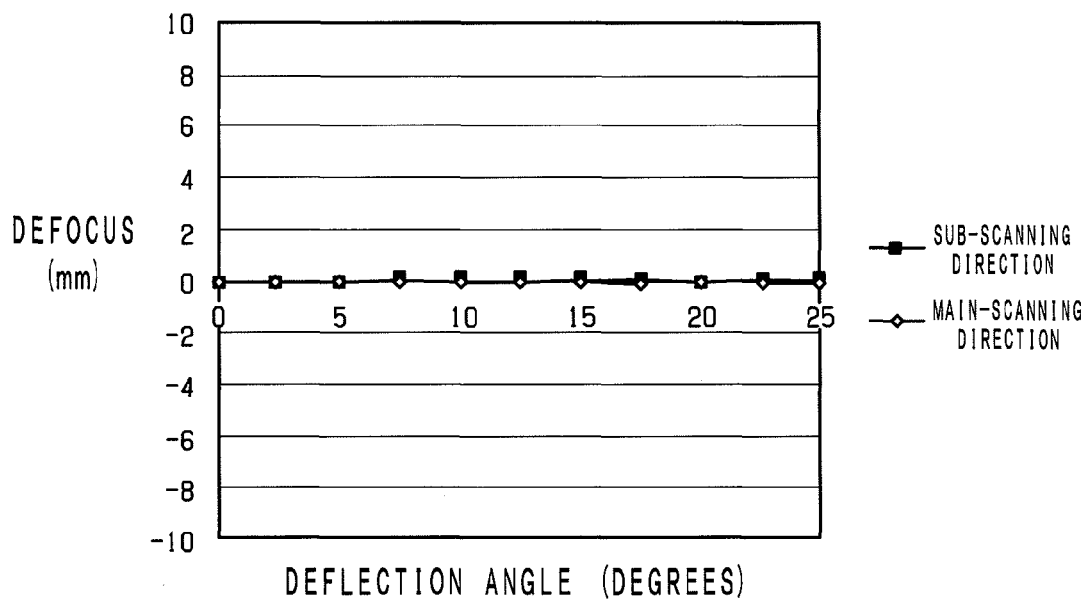
FIG. 7 is a graph showing a field curvature in a comparative example 2.

FIG. 7 shows calculated defocus in a comparative example 2. In the comparative example 2, the scanning lens in the comparative example 1 is replaced with such a lens to correct the field curvature, and the comparative example 2 can be deemed as an example of conventional optical scanning devices.

Figure 8:
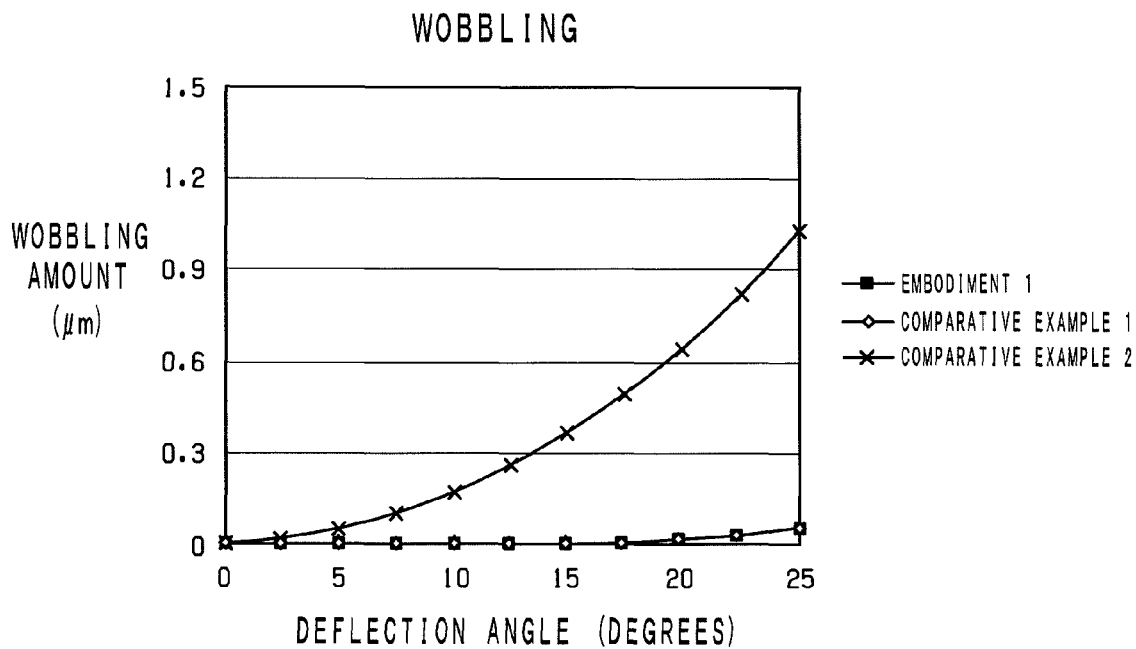
FIG. 8 is a graph showing wobbling in the first embodiment and in the comparative examples 1 and 2.

FIG. 8 shows wobbling amounts in the first embodiment, and the comparative examples 1 and 2. Here, the wobbling amount means an amount of displacement of the beam spot on a photoreceptor surface. A cause of wobbling is errors in the angle of the reflecting surfaces of the polygon mirror 14. Here, the angle of gradient of the reflecting surfaces is designed to be 1 minute.

When the plurality of reflecting surfaces 14a of the polygon mirror 14 are inclined relative to one another, the light beam is reflected at different angles by the respective reflecting surfaces. As the polygon mirror 14 rotates many times to perform scanning (image writing), the reflection at different angles by the respective reflecting surfaces results in periodic irregularity in an image. In order to avoid this trouble, as shown in the comparative example 2, a cylindrical lens is usually used to cause a light beam to converge in the vicinity of the reflecting surface 14a only in the sub-scanning direction z, and then, the light beam is caused to converge again on the photoreceptor 10 by a scanning lens. Thereby, conjugate relation between each reflecting surface 14a and the photoreceptor 10 is maintained, and the wobbling amount is reduced.

Another cause of wobbling is deflection angle. The position where a bundle of rays is received by one of the reflecting surface 14a move with rotations of the polygon mirror 14, while the converging point of the light beam that passed through the cylindrical lens is fixed. Therefore, when the polygon mirror 14 and the photoreceptor 10 are disposed such that each of the reflecting surfaces 14a and the photoreceptor 10 are in conjugate relation at a certain deflection angle, converging points at other deflection angles wobble on the photoreceptor 10. According to the comparative example 2, each of the reflecting surfaces 14a and the photoreceptor 10 are in conjugate relation at a deflection angle of 0°, and at this angle, the wobbling amount is substantially 0. However, the wobbling amount increases as the deflection angle increases, and wobbling on the order of 1 μm occurs in the peripheral portions of an image (in the edge portions of the main-scanning range). The polygon mirror 14 and the photoreceptor 10 may be disposed such that each of the reflecting surfaces 14a and the photoreceptor 10 are in conjugate relation at another specific deflection angle, but wobbling still occurs at angles other than this specific deflection angle.

According to the comparative example 1, the scanning lens is configured such that the conjugate relation is maintained at every deflection angle, and thereby, the wobbling amount is maintained to be small as compared to the case of the comparative example 2. However, the light source optical system of the comparative example 1 is based on the conventional technique, as shown in FIG. 6, defocus occurs in the sub-scanning direction z, and uniformity in image formation degrades. The defocus amount is the result of multiplication of a distance between the converging point in the sub-scanning direction z and the reflecting surface 14a along the principal ray by a square of sub-scanning magnification. According to the comparative example 1, the light beam converges accurately on the reflecting surface 14a when the light beam is incident to the polygon mirror 14 to cause a deflection angle of 0°, that is, to be directed to the center portion of the photoreceptor 10 in the main-scanning direction y. The defocus amount d in the sub-scanning direction z viewed along the principal ray is expressed by Equation 3 below.

$$d = \beta^2 r \frac{1 - \cos\frac{\theta}{2}}{\cos\alpha} \quad (3)$$

In Equation 3 above, β represents the sub-scanning magnification, r represents the radius of the inscribed circle of the polygon mirror, θ represents the deflection angle, and α represents the angle of gradient of the light beam incident to the polygon mirror in the sub-scanning direction z. In the comparative example 1, α is 5°.

Generally, as in the case of the comparative example 2, it is attempted to suppress defocus even though the conjugate relation cannot be achieved at all deflection angles. In this case, the defocus amount based on the above equation corresponds to a displacement amount of the photoreceptor from a conjugate point in conjugation with the reflecting surface 14a.

Figure 9:
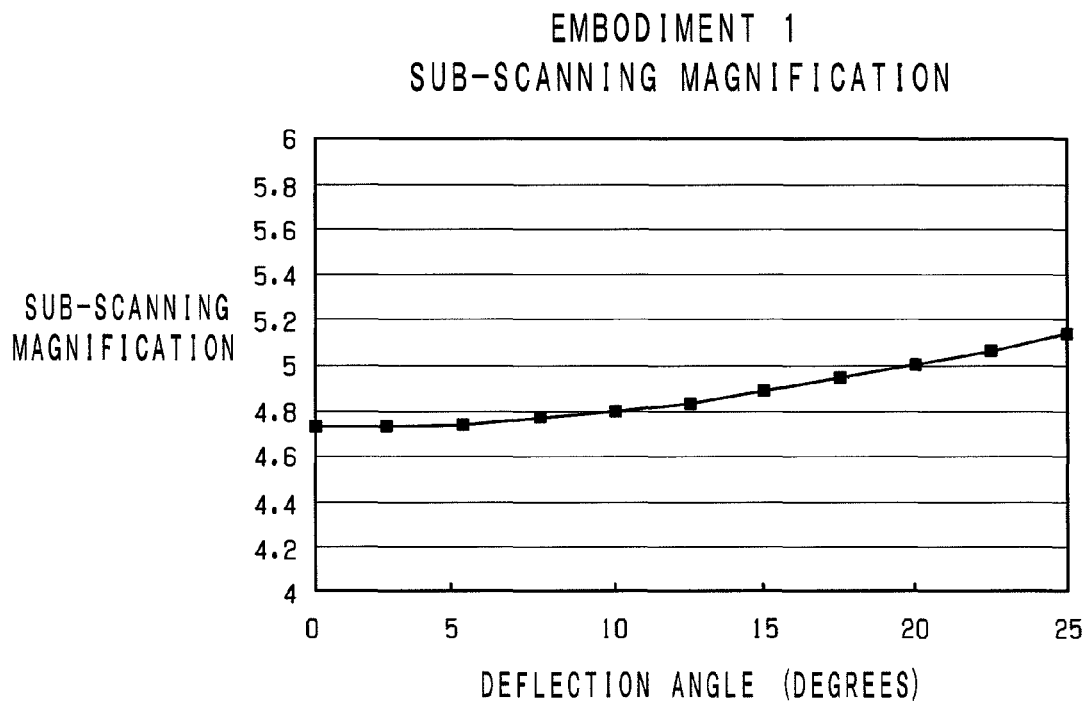
FIG. 9 is a graph showing sub-scanning magnification in the first embodiment.
Figure 10A:
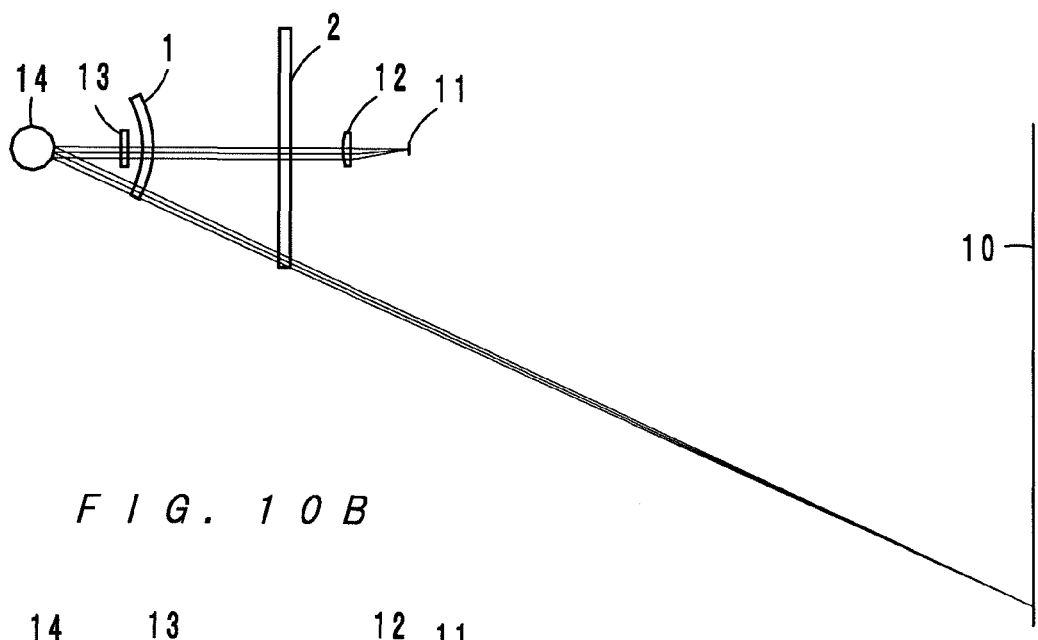
FIG. 10A to FIG. 10D show an optical path according to a second embodiment, where
Figure 10B:
Figure 10C:
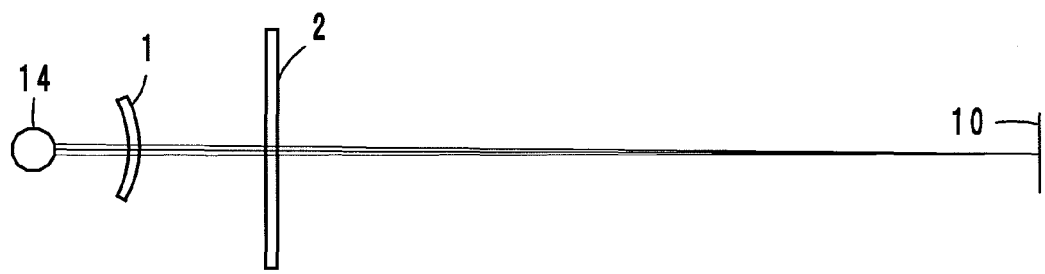
Figure 10D:
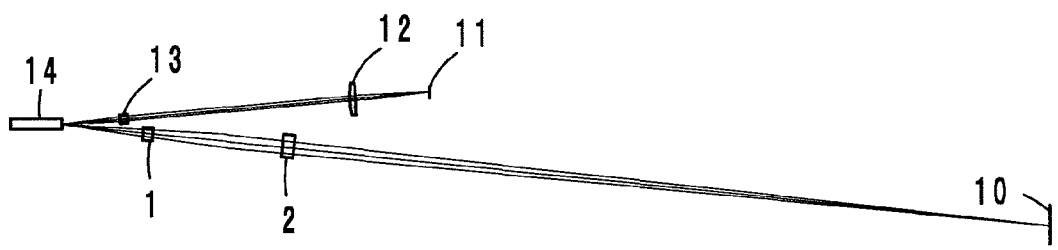

When the scanning lenses 1 and 2 are disposed closer to the polygon mirror 14, shorter lenses can be used as the lenses 1 and 2, and the optical scanning device as a whole can be downsized. On the other hand, the absolute value of the sub-scanning magnification increases. According to the conventional technique, when the absolute value of the sub-scanning magnification increases, the displacement from the conjugation point increases, and wobbling increases, whereby image quality deteriorates. Thus, according to the conventional technique, such a trade-off occurs. According to the first embodiment, however, wobbling can be suppressed even when the absolute value of the sub-scanning magnification becomes large. Therefore, the concept of the first embodiment is more useful when the absolute value of the sub-scanning magnification is large. The absolute value of the sub-scanning magnification in the first embodiment is shown in FIG. 9.

Second Embodiment

See FIGS. 10 to FIG. 14

As shown in FIG. 10, an optical scanning according to a second embodiment is basically of a similar structure to that of the first embodiment. The optical scanning device according to the second embodiment generally comprises a laser diode 11 as a light source, a collimator lens 12, a free-form-surface lens 13, a polygon mirror 14 having a plurality of flat reflecting surfaces, and scanning lenses 1 and 2. The second embodiment is different from the first embodiment in that the scanning lenses 1 and 2 are disposed slightly farther from the polygon mirror 14. Further, effects of the second embodiment are basically the same as those of the first embodiment.

Table 4, Table 5, and Table 6 below show construction data that numerically represents the second embodiment. Although the positional relation among the optical elements in the second embodiment is different from that in the first embodiment, the types of the surfaces, the positioning order of the optical elements, the wavelength used, the kinds of glass and resin, the number of reflecting surfaces and the size of the polygon mirror 14 are the same as those in the first embodiment.

TABLE 4

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface | 29.89 | 0.00 | 2.61 | −0.9962 | 0.0000 | −0.0872 | 0.0000 | 1.0000 | 0.0000 |
| 4 | Lens | 26.90 | 0.00 | 2.35 | −0.9962 | 0.0000 | −0.0872 | 0.0000 | 1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Scanning Lens 1 | 35.00 | 0.00 | −3.06 | 0.9962 | 0.0000 | −0.0872 | 0.0000 | 1.0000 | 0.0000 |
| 7 | | 40.98 | 0.00 | −3.59 | 0.9962 | 0.0000 | −0.0872 | 0.0000 | 1.0000 | 0.0000 |
| 8 | Scanning Lens 2 | 90.50 | 0.00 | −7.92 | 0.9962 | 0.0000 | −0.0872 | 0.0000 | 1.0000 | 0.0000 |
| 9 | | 94.98 | 0.00 | −8.31 | 0.9962 | 0.0000 | −0.0872 | 0.0000 | 1.0000 | 0.0000 |
| 10 | Photoreceptor Surface | 394.15 | 0.00 | −28.02 | 1.0000 | 0.0000 | 0.0000 | 0.0000 | 1.0000 | 0.0000 |

TABLE 5

Surface No. 1: Spherical Surface
Curvature 4.33126E−03

Surface No. 2: Axisymmetric Aspherical Surface
Curvature

−6.68860E−02

| Degree | Coefficient |
|---|---|
| 4 | 2.50752E−05 |
| 6 | 8.92745E−08 |
| 8 | −2.78758E−10 |
| 10 | 2.15187E−11 |
| 12 | −2.55070E−13 |

Surface No. 3: Free-form Surface

| | j | |
|---|---|---|
| i | 2 | 4 |
| 0 | 3.02297E−02 | −3.89579E−04 |
| 2 | −7.49808E−05 | 5.59231E−05 |
| 4 | 1.87836E−06 | −1.83939E−06 |

TABLE 6

Surface No. 6: Free-form Surface

| | j |
|---|---|
| i | 0 |
| 2 | −1.43844E−02 |
| 4 | 2.20262E−06 |

TABLE 6-continued

| | | |
|---|---|---|
| 6 | 8.13829E−09 | |
| 8 | −4.56287E−12 | |
| 10 | −2.652563E−16 | |

| | j | | |
|---|---|---|---|
| i | 0 | 1 | 2 |

Surface No. 7: Free-form Surface

| 0 | 0.00000E+00 | 1.17030E−02 | 8.92301E−03 |
| 2 | −1.66115E−02 | 3.07457E−05 | −7.83509E−06 |
| 4 | 1.08968E−06 | −7.34599E−09 | −2.83518E−08 |
| 6 | 5.15445E−09 | −3.97889E−11 | 2.12848E−11 |
| 8 | 1.45749E−12 | 0.00000E+00 | 0.00000E+00 |

TABLE 6-continued

| 10 | −2.85968E−15 | 0.00000E+00 | 0.00000E+00 |

Surface No. 8: Free-form Surface

| 0 | 0.00000E+00 | −3.29526E−02 | 1.41584E−02 |
| 2 | −8.49249E−04 | 1.45491E−05 | −1.64581E−06 |
| 4 | 7.15186E−07 | −2.57367E−09 | −2.32607E−10 |
| 6 | −1.79942E−10 | 2.99454E−13 | 2.93198E−13 |
| 8 | 3.05456E−14 | 2.33408E−17 | −1.16010E−16 |
| 10 | −2.61001E−18 | −1.53992E−20 | 1.90316E−20 |

Figure 11:
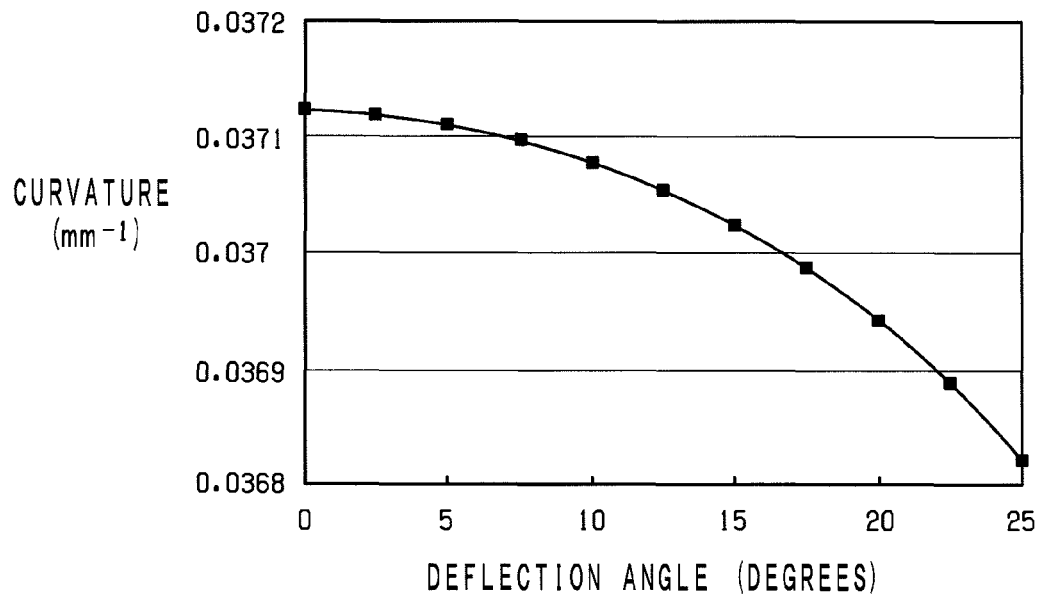
FIG. 11 is a graph showing an average wavefront curvature in a sub-scanning direction of a light beam in the second embodiment.

With respect to the second embodiment, an average wavefront curvature in the sub-scanning direction z of a light beam immediately after emergent from the free-form-surface lens 13 was calculated. FIG. 11 shows the results. The average wavefront curvature decreases as the deflection angle increases.

Figure 12:
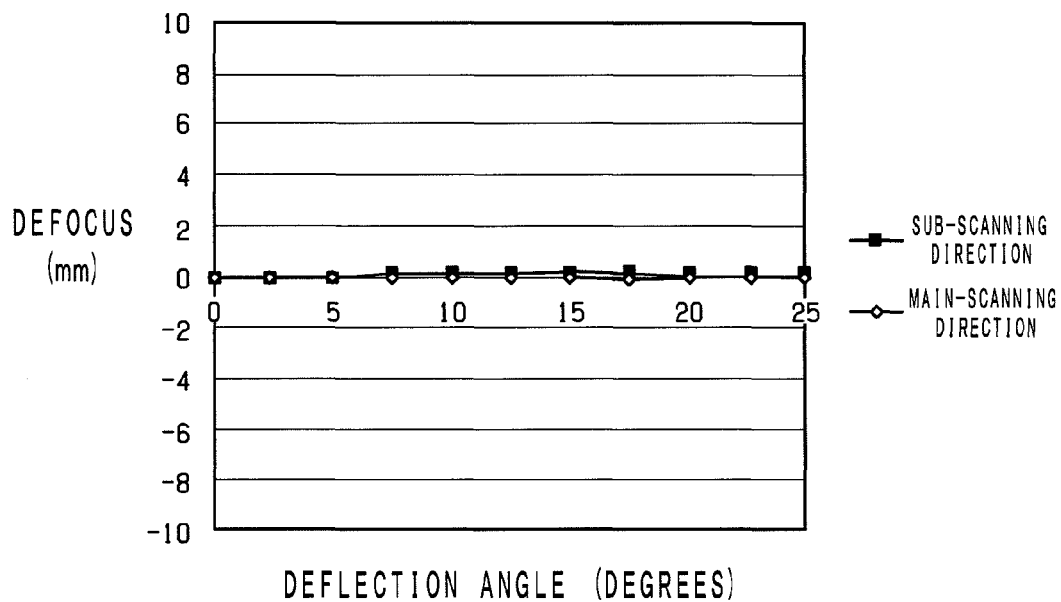
FIG. 12 is a graph showing a field curvature in the second embodiment.
Figure 13:
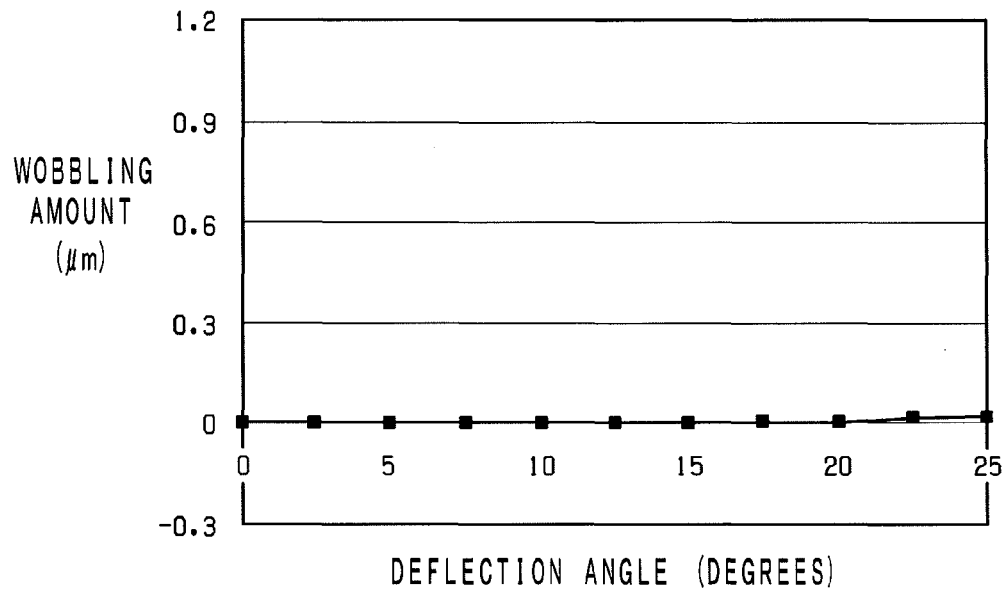
FIG. 13 is a graph showing wobbling in the second embodiment.
Figure 14:
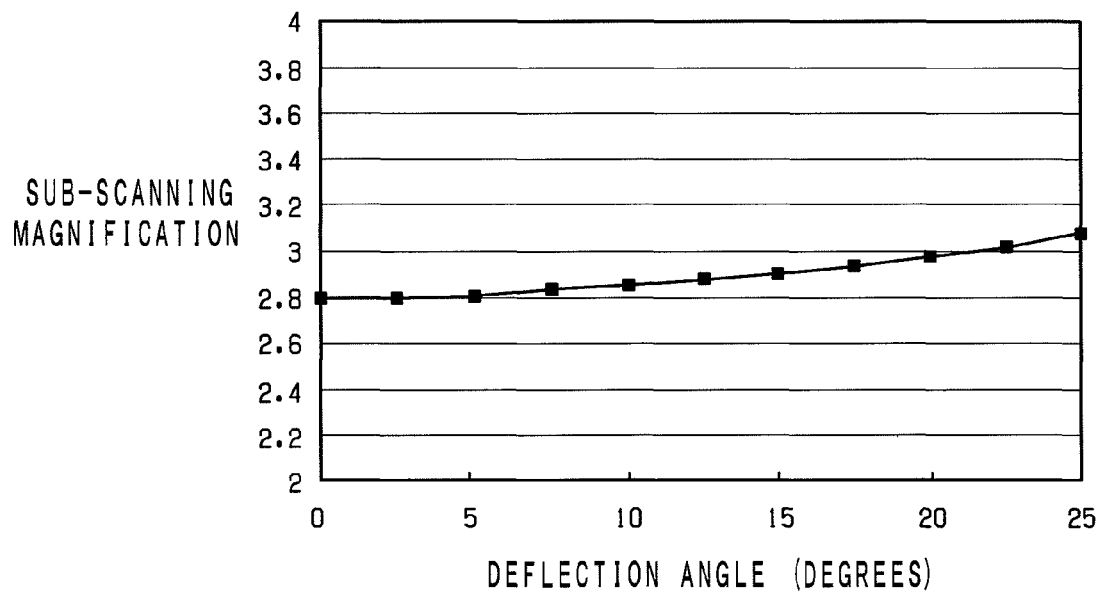
FIG. 14 is a graph showing sub-scanning magnification in the second embodiment.
Figure 15A:
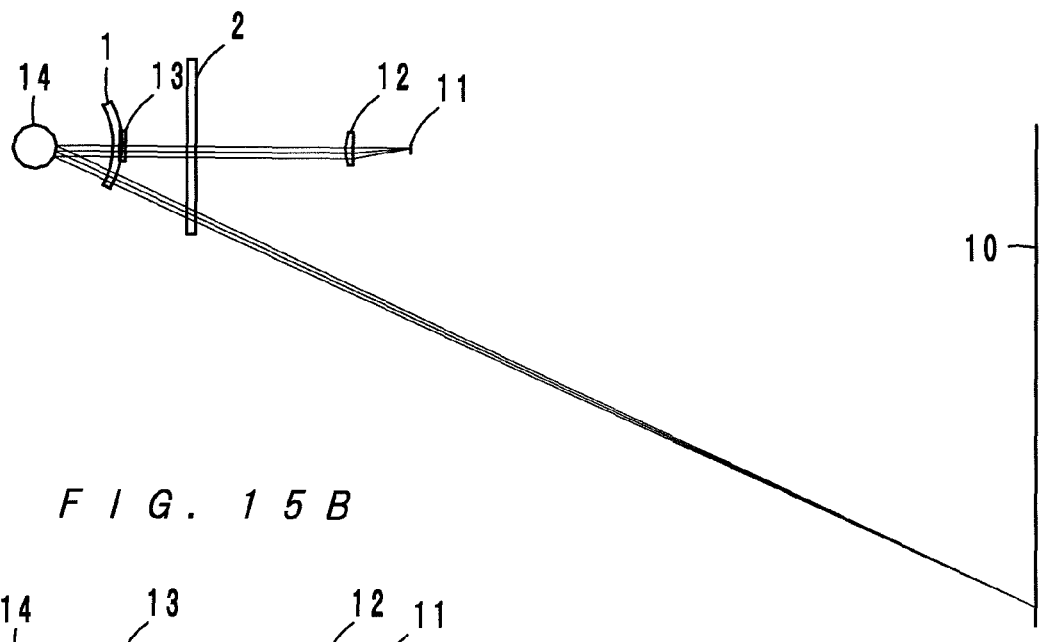
FIG. 15A to FIG. 15D show an optical path according to a third embodiment, where
Figure 15B:
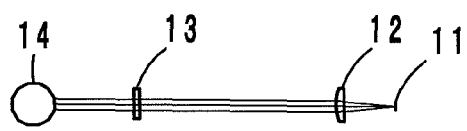
Figure 15C:
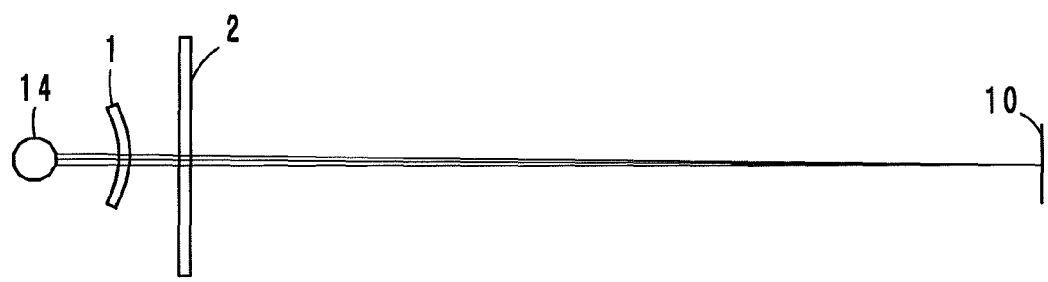
Figure 15D:
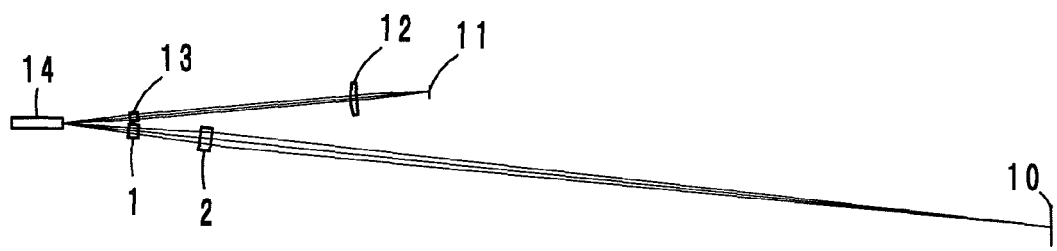

FIG. 12 shows results of calculation of defocus from the photoreceptor 10 in the second embodiment, and the graph of FIG. 12 represents a field curvature. FIG. 13 shows wobbling in the second embodiment. FIG. 14 shows the absolute value of sub-scanning magnification in the second embodiment. According to the second embodiment, since the scanning lenses 1 and 2 are positioned farther from the polygon mirror 14 as compared to the first embodiment, the absolute value of the sub-scanning magnification is smaller.

Third Embodiment

See FIGS. 15 to 19

As shown in FIG. 15, an optical scanning according to a third embodiment is basically of a similar structure to that of the first embodiment. The optical scanning device according to the third embodiment generally comprises a laser diode 11 as a light source, a collimator lens 12, a free-form-surface lens 13, a polygon mirror 14 having a plurality of flat reflecting surfaces, and scanning lenses 1 and 2. The third embodiment is different from the first embodiment in that the scanning lenses 1 and 2 are disposed slightly closer to the polygon mirror 14. Further, effects of the third embodiment are basically the same as those of the first embodiment.

Table 7, Table 8, and Table 9 below show construction data that numerically represents the third embodiment. Although the positional relation among the optical elements in the third embodiment is different from that in the first embodiment, the types of the surfaces, the positioning order of the optical elements, the wavelength used, the kinds of glass and resin, the number of reflecting surfaces and the size of the polygon mirror 14 are the same as those in the first embodiment.

TABLE 7

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface Lens | 29.89 | 0.00 | 2.61 | −0.9962 | 0.0000 | −0.0872 | 0.0000 | 1.0000 | 0.0000 |
| 4 | | 26.90 | 0.00 | 2.35 | −0.9962 | 0.0000 | −0.0872 | 0.0000 | 1.0000 | 0.0000 |
| 5 | Polygon Mirror | 0.00 | 0.00 | 0.00 | −1.0000 | 0.0000 | −0.0006 | 0.0000 | −1.0000 | 0.0000 |
| 6 | Scanning Lens 1 | 25.00 | 0.00 | −2.19 | 0.9962 | 0.0000 | −0.0872 | 0.0000 | 1.0000 | 0.0000 |
| 7 | | 29.48 | 0.00 | −2.58 | 0.9962 | 0.0000 | −0.0872 | 0.0000 | 1.0000 | 0.0000 |
| 8 | Scanning Lens 2 | 50.00 | 0.00 | −4.37 | 0.9962 | 0.0000 | −0.0872 | 0.0000 | 1.0000 | 0.0000 |
| 9 | | 53.98 | 0.00 | −4.72 | 0.9962 | 0.0000 | −0.0872 | 0.0000 | 1.0000 | 0.0000 |
| 10 | Photoreceptor Surface | 385.17 | 0.00 | −41.84 | 1.0000 | 0.0000 | 0.0000 | 0.0000 | 1.0000 | 0.0000 |

TABLE 8

Surface No. 1: Spherical Surface Curvature 4.33126E−03

Surface No. 2: Axisymmetric Aspherical Surface Curvature

−6.68860E−02

| Degree | Coefficient |
|---|---|
| 4 | 2.50752E−05 |
| 6 | 8.92745E−08 |
| 8 | −2.78758E−10 |
| 10 | 2.15187E−11 |
| 12 | −2.55070E−13 |

Surface No. 3: Free-form Surface

| | j | |
|---|---|---|
| i | 2 | 4 |
| 0 | 3.02286E−02 | −1.33426E−04 |
| 2 | −7.23238E−05 | 1.94541E−05 |
| 4 | 1.13294E−06 | −6.73898E−08 |

TABLE 9

Surface No. 6: Free-form Surface

| | j |
|---|---|
| i | 0 |
| 2 | −2.57264E−02 |
| 4 | 1.15151E−05 |
| 6 | 1.69115E−07 |

TABLE 9-continued

| | | |
|---|---|---|
| 8 | −2.16275E−10 | |
| 10 | −2.88833E−13 | |

| | j | | |
|---|---|---|---|
| i | 0 | 1 | 2 |

Surface No. 7: Free-form Surface

| 0 | 0.00000E+00 | −2.20349E−02 | 9.42300E−03 |
| 2 | −2.79739E−02 | 7.60145E−05 | −2.30799E−05 |
| 4 | 9.41856E−06 | 1.82842E−07 | −2.00407E−07 |
| 6 | 9.14395E−08 | −7.80707E−10 | 4.27818E−10 |
| 8 | 1.10888E−10 | 0.00000E+00 | 0.00000E+00 |

TABLE 9-continued

| 10 | −5.46767E−13 | 0.00000E+00 | 0.00000E+00 |

Surface No. 8: Free-form Surface

| 0 | 0.00000E+00 | 3.09610E−02 | 2.33893E−02 |
| 2 | −2.10220E−03 | 7.23322E−05 | −1.06239E−05 |
| 4 | 6.02972E−06 | −6.20319E−08 | −4.78891E−09 |
| 6 | −5.52286E−09 | 2.73462E−11 | 2.40066E−11 |
| 8 | 3.41684E−12 | 7.60789E−15 | −3.32865E−14 |
| 10 | −1.05844E−15 | −1.07732E−17 | 1.74894E−17 |

Figure 16:
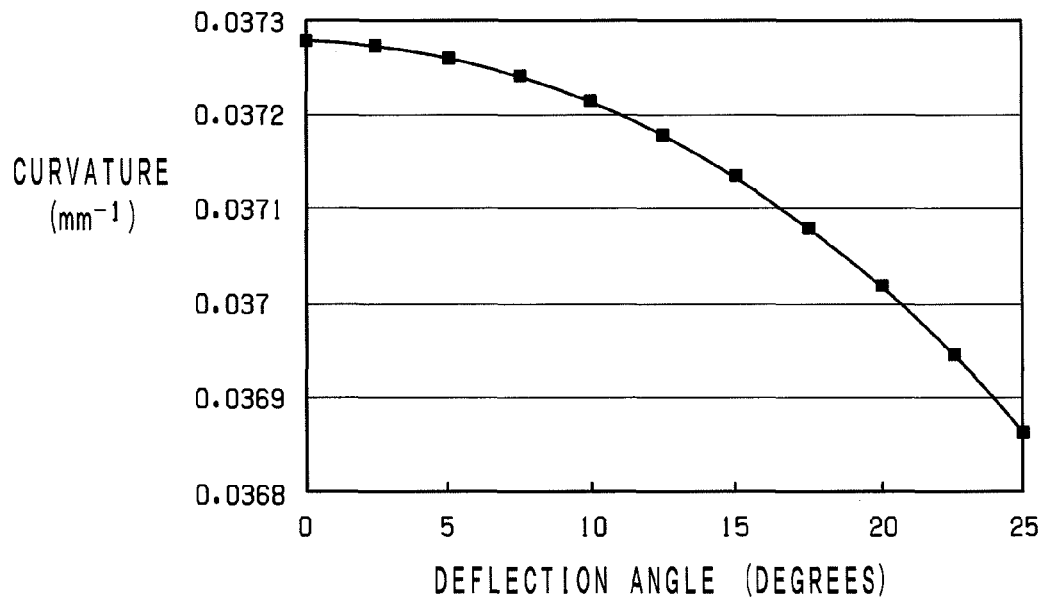
FIG. 16 is a graph showing an average wavefront curvature of in a sub-scanning direction of a light beam in the third embodiment.

With respect to the third embodiment, an average wavefront curvature in the sub-scanning direction z of a light beam immediately after emergent from the free-form-surface lens 13 was calculated. FIG. 16 shows the results. The average wavefront curvature decreases as the deflection angle increases.

Figure 17:
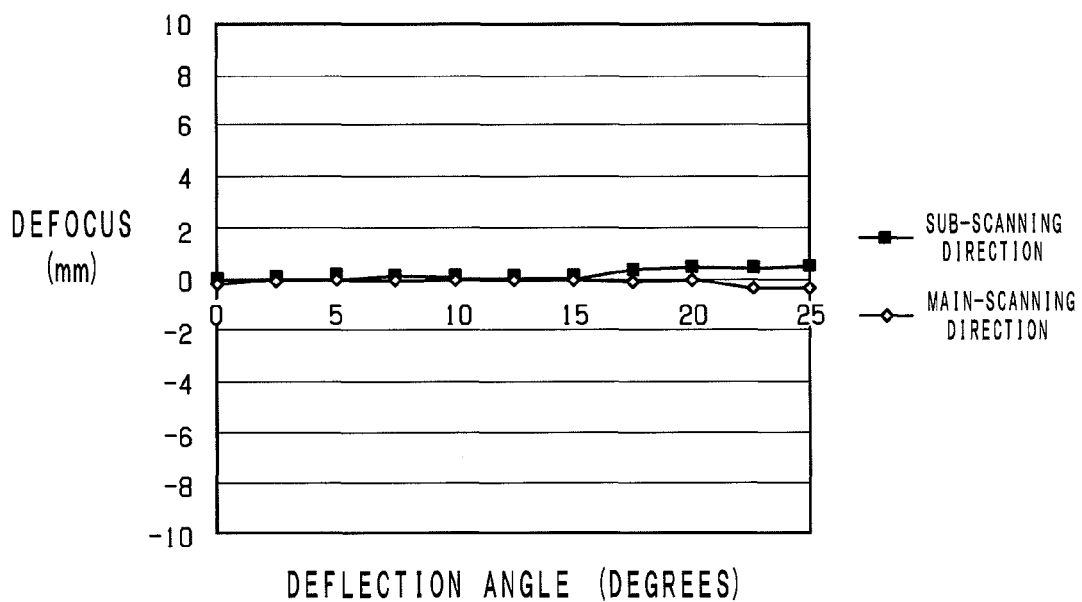
FIG. 17 is a graph showing a field curvature in the third embodiment.
Figure 18:
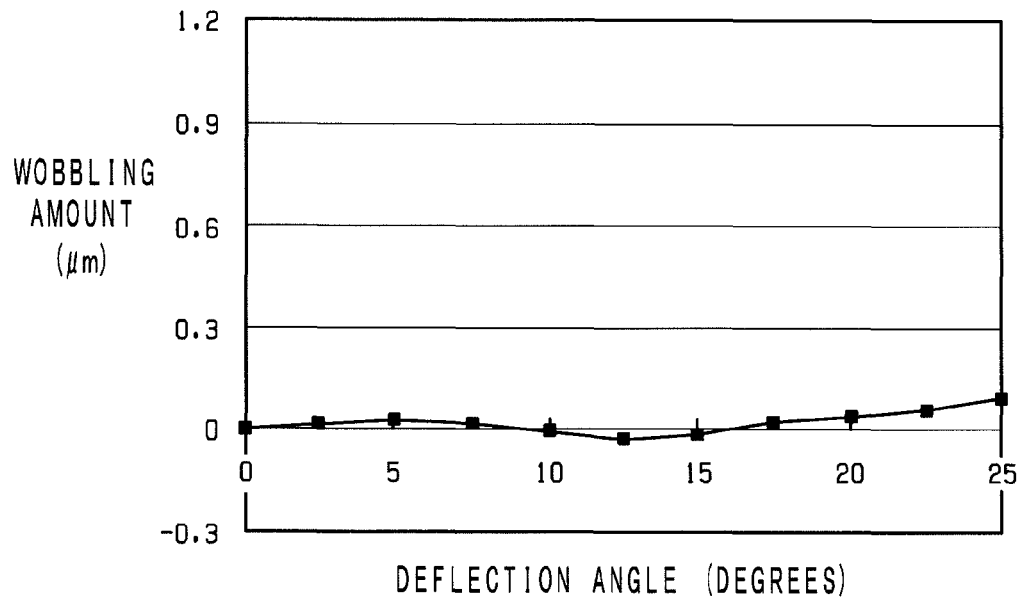
FIG. 18 is a graph showing wobbling in the third embodiment.
Figure 19:
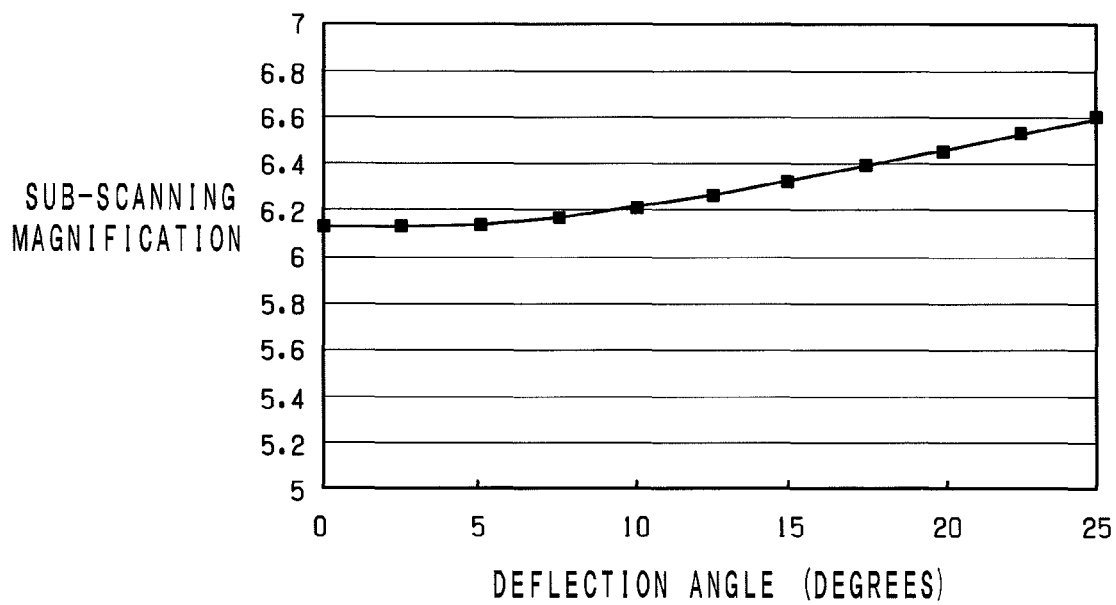
FIG. 19 is a graph showing sub-scanning magnification in the third embodiment.
Figure 20A:
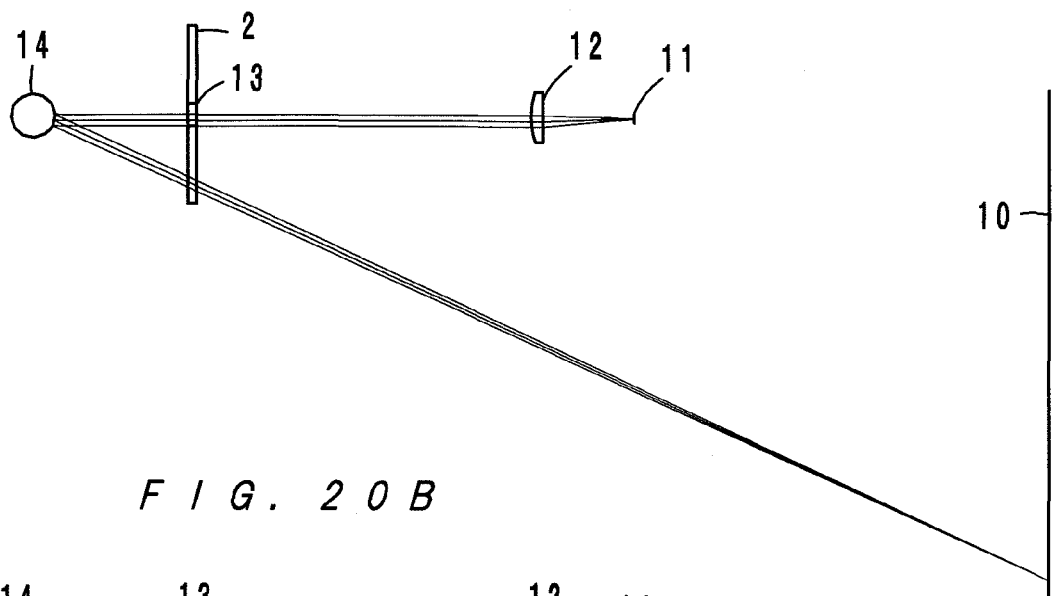
FIG. 20A to FIG. 20D show an optical path according to a fourth embodiment, where
Figure 20B:
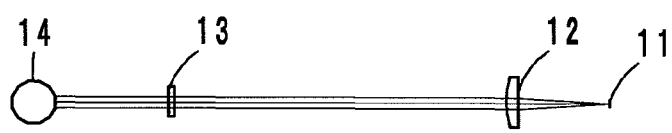
Figure 20C:
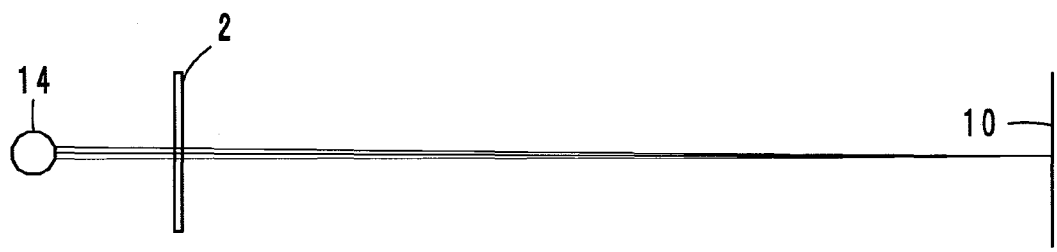
Figure 20D:
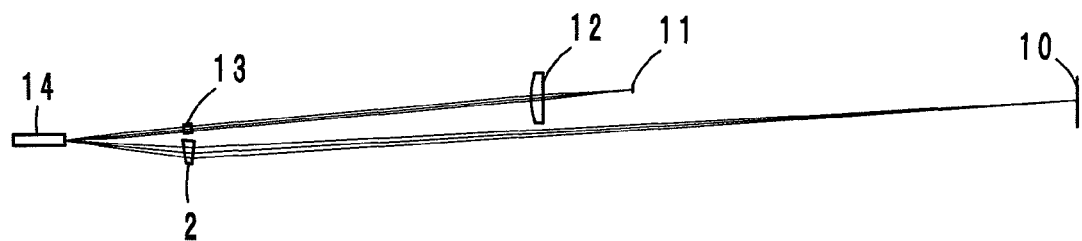

FIG. 17 shows results of calculation of defocus from the photoreceptor 10 in the third embodiment, and the graph of FIG. 17 represents a field curvature. FIG. 18 shows wobbling in the second embodiment. FIG. 19 shows the absolute value of sub-scanning magnification in the second embodiment. According to the third embodiment, since the scanning lenses 1 and 2 are positioned closer to the polygon mirror 14 as compared to the first embodiment, the absolute value of the sub-scanning magnification is larger.

Fourth Embodiment

See FIGS. 20 to 25

As shown in FIG. 20, an optical scanning according to a fourth embodiment is basically of a similar structure to that of the first embodiment. The optical scanning device according to the third embodiment generally comprises a laser diode 11 as a light source, a collimator lens 12, a free-form-surface lens 13, a polygon mirror 14 having a plurality of flat reflecting surfaces and a scanning lens 2. The fourth embodiment is different from the first embodiment in that only one scanning lens 2 is provided. Further, the effects of the fourth embodiment are basically the same as those of the first embodiment.

Table 10, Table 11, and Table 12 below show construction data that numerically represents the fourth embodiment. In the fourth embodiment, the free-form surface of the free-form-surface lens 13 in the light source side is expressed by an equation that have a term of Z0 order that is not 0, and the free-form surface has a curvature in the main-scanning direction y. On the other hand, the free-form surface of the scanning lens 2 disposed after the polygon mirror 14 is expressed by an equation that have a term of Z0 order that is 0, and the free-form surface does not have a curvature in the main-scanning direction y within a cross-section where z=0. Thus, according to the fourth embodiment, the free-form surface lens 13 in the light source side causes a light beam to converge on the photoreceptor 10 in the main-scanning direction y, and the free-form surface lens (the scanning lens 2) after the polygon mirror 14 does not have any effect on convergence of the light beam in the main-scanning direction y. Further, the wavelength used and the kind of glass are the same as those in the first embodiment. The resin has a refractive index of 1.525 when the wavelength used is incident thereto, and the polygon mirror 14 is configured as a dodecagon whose inscribed circle has a diameter of 10 mm.

TABLE 10

| Surface Number | Name of Component | Position of Origin of Local Coordinate System | | | X-axis Vector in Local Coordinate System | | | Y-axis Vector in Local Coordinate System | | |
|---|---|---|---|---|---|---|---|---|---|---|
| | | x | y | z | x | y | z | x | y | z |
| 1 | Collimator Lens | 119.09 | 0.00 | 10.42 | −0.9962 | 0.0000 | −0.0872 | 0.0000 | −1.0000 | 0.0000 |
| 2 | | 116.10 | 0.00 | 10.16 | −0.9962 | 0.0000 | −0.0872 | 0.0000 | −1.0000 | 0.0000 |
| 3 | Free-form-surface Lens | 32.00 | 0.00 | 2.62 | −1.0000 | 0.0000 | 0.0000 | 0.0000 | 1.0000 | 0.0000 |
| 4 | | 30.00 | 0.00 | 2.62 | −1.0000 | 0.0000 | 0.0000 | 0.0000 | 1.0000 | 0.0000 |
| 5 | Polygon Mirror | 0.00 | 0.00 | 0.00 | −1.0000 | 0.0000 | 0.0000 | 0.0000 | −1.0000 | 0.0000 |
| 6 | Scanning Lens | 30.00 | 0.00 | −2.62 | 1.0000 | 0.0000 | 0.0000 | 0.0000 | 1.0000 | 0.0000 |
| 7 | | 32.00 | 0.00 | −2.62 | 1.0000 | 0.0000 | 0.0000 | 0.0000 | 1.0000 | 0.0000 |
| 8 | Photoreceptor Surface | 250.00 | 0.00 | 9.75 | 1.0000 | 0.0000 | 0.0000 | 0.0000 | 1.0000 | 0.0000 |

TABLE 11

Surface No. 1: Spherical Surface
Curvature 4.33126E−03

Surface No. 2: Axisymmetric Aspherical Surface
Curvature

−6.68860E−02

| Degree | Coefficient |
|---|---|
| 4 | 2.50752E−05 |
| 6 | 8.92745E−08 |
| 8 | −2.78758E−10 |
| 10 | 2.15187E−11 |
| 12 | −2.55070E−13 |

Surface No. 4: Free-form Surface

| | | j | | | |
|---|---|---|---|---|---|
| I | 0 | 1 | 2 | 3 | 4 |
| 0 | 0.00000E+00 | 0.00000E+00 | −3.11201E−02 | −5.16846E−04 | −4.60427E−05 |
| 2 | −3.43248E−03 | −7.14881E−05 | −3.12270E−02 | 0.00000E+00 | 2.08141E−04 |
| 4 | 8.22693E−05 | 4.26047E−05 | 3.72922E−05 | 0.00000E+00 | −3.87129E−05 |
| 6 | −1.93457E−05 | −3.60435E−06 | 2.22215E−06 | 0.00000E+00 | 2.63416E−06 |
| 8 | 1.60757E−06 | 0.00000E+00 | 0.00000E+00 | 0.00000E+00 | 0.00000E+00 |

TABLE 12

| Surface No. 6: Free-form Surface | | | |
| --- | --- | --- | --- |
| | i | | |
| i | 1 | 2 | 3 |
| 0 | −2.71954E−01 | 3.40880E−02 | 2.42354E−04 |
| 2 | 6.41103E−05 | −2.61488E−05 | 0.00000E+00 |
| 4 | −7.76001E−08 | 2.37461E−08 | 0.00000E+00 |
| 6 | 8.98807E−11 | −1.37637E−11 | 0.00000E+00 |

Figure 21:
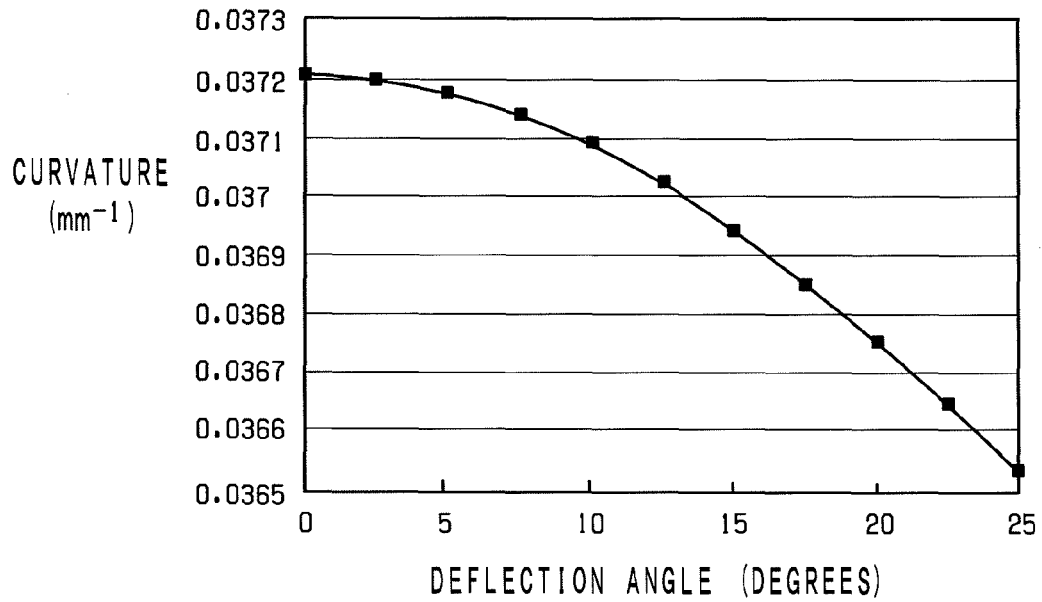
FIG. 21 is a graph showing an average wavefront curvature in a sub-scanning direction of the light beam in the fourth embodiment.

With respect to the fourth embodiment, an average wavefront curvature in the sub-scanning direction z of a light beam immediately after emergent from the free-form-surface lens 13 was calculated. FIG. 21 shows the results. The average wavefront curvature decreases as the deflection angle increases.

Figure 22:
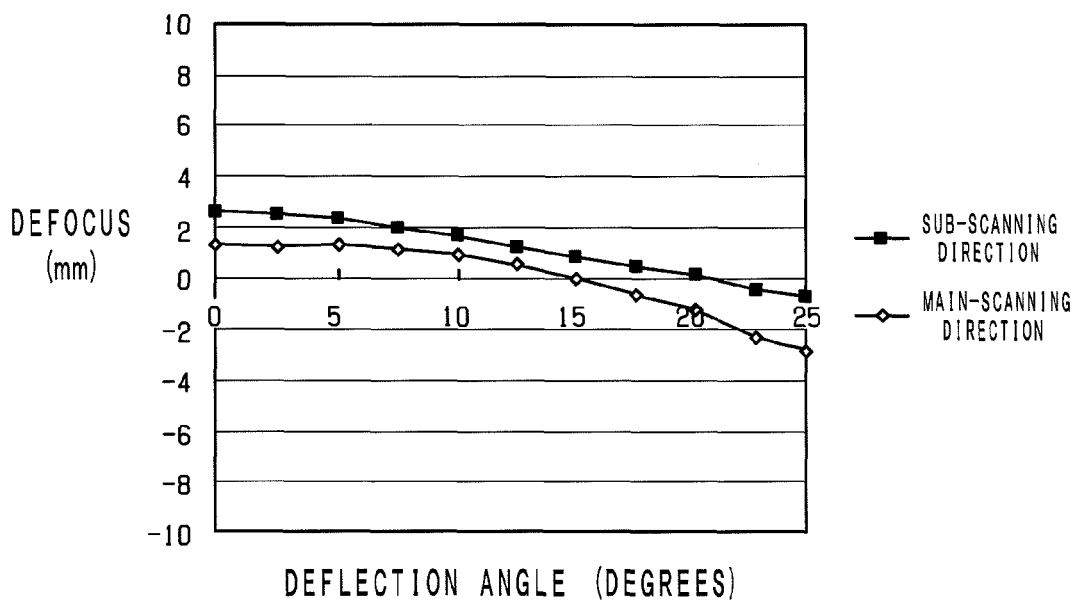
FIG. 22 is a graph showing defocus of the whole rays of the light beam in the fourth embodiment.
Figure 23:
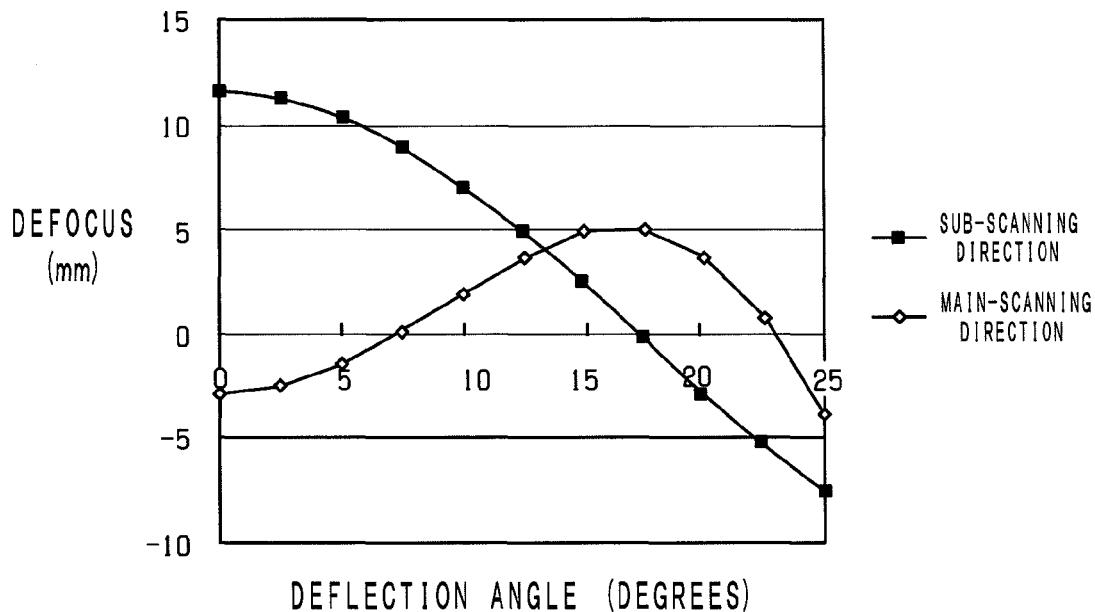
FIG. 23 is a graph showing defocus of near-principal rays of the light beam in the fourth embodiment.

FIG. 22 shows results of calculation of defocus from the photoreceptor 10 in the fourth embodiment, and the graph of FIG. 22 represents a field curvature. In the first to third embodiments, since aberrations are corrected sufficiently, there is no difference between the converging point of near-principal rays of the light beam and the converging point of the whole rays of the light beam. However, according to the fourth embodiment, as the converging position is controlled based on the aberration caused by the free-form-surface lens 13 in the light source side, residual aberration is relatively large, and there is a difference between the converging point of near-principal rays of the light beam and the converging point of the whole rays of the light beam. FIG. 23 shows defocus of near-principal rays in the fourth embodiment.

Figure 24:
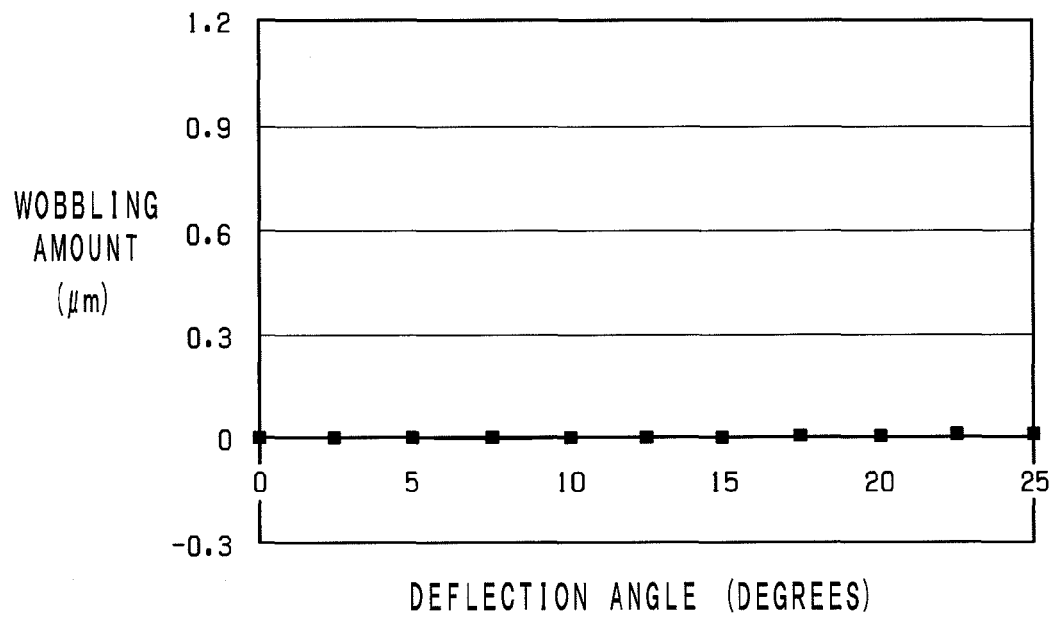
FIG. 24 is a graph showing wobbling in the fourth embodiment.
Figure 25:
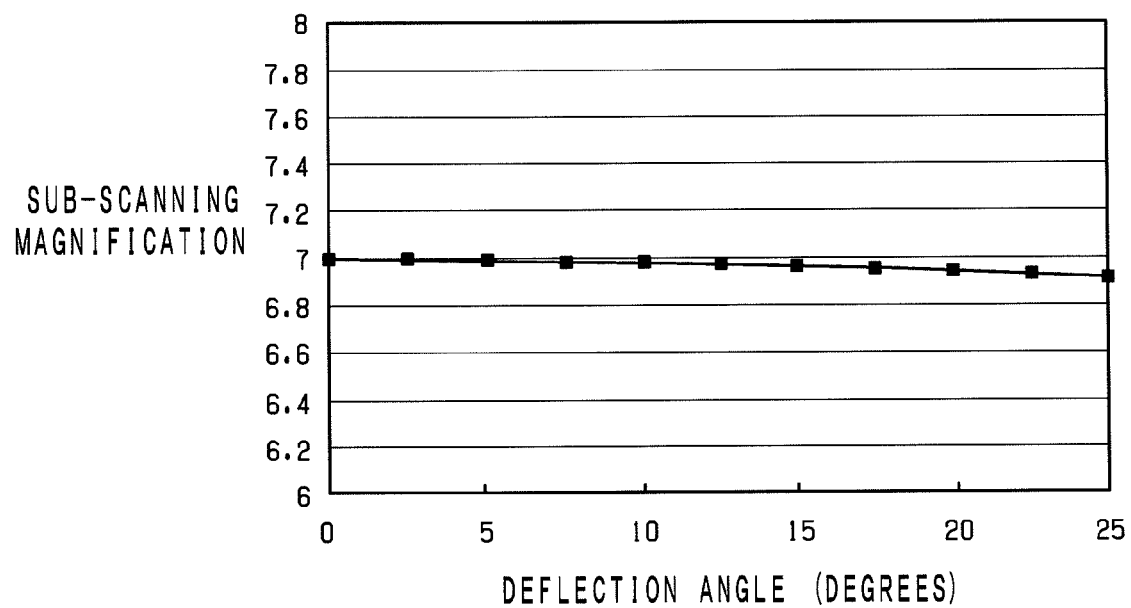
FIG. 25 is a graph showing sub-scanning magnification in the fourth embodiment.

FIG. 24 shows wobbling in the fourth embodiment. Further, FIG. 25 shows the absolute value of sub-scanning magnification in the fourth embodiment.

The optical scanning devices according to the embodiments above use an over-filled optical system and can achieve a good balance between focusing of a light beam onto a photoreceptor surface and correction to errors in the angle of reflecting surfaces of a polygon mirror.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical scanning device, comprising:
a light source for emitting a light beam;
a deflector having a plurality of flat reflecting surfaces;
a first optical system disposed between the light source and the deflector; and
a second optical system disposed between the deflector and a photoreceptor surface, and configured such that the reflecting surfaces of the deflector and the photoreceptor surface are conjugated in a sub-scanning direction at every deflection angle in a main-scanning range;
wherein the light beam traveling from the first optical system to the deflector has a width greater than a dimension in a main-scanning direction of each reflecting surface of the deflector, and
wherein the light beam passes through different portions of the first optical system depending on whether the light beam is to be deflected by the deflector to be directed to an edge portion of the main-scanning range or to be directed to a center portion of the main-scanning range such that the light beam traveling to the deflector has a smaller average wavefront curvature in a sub-scanning direction when the light beam is to be deflected by the deflector to be directed to an edge portion of the main-scanning range than when the light beam is to be deflected by the deflector to be directed to the center portion of the main-scanning range.

2. The optical system according to claim 1, wherein the second optical system has no refracting power in the main-scanning direction.

3. The optical scanning device according to claim 2, wherein the second optical system has a refracting property of causing the light beam deflected at an equiangular speed in the main-scanning direction by the deflector to scan the photoreceptor surface at a constant speed in the main-scanning direction.

4. The optical scanning device according to claim 1, wherein the second optical system has an absolute value of imaging magnification in the sub-scanning direction that is equal to or greater than 2.5 between each of the reflecting surfaces of the deflector and the photoreceptor surface.

* * * * *